(12) United States Patent
Linger et al.

(10) Patent No.: US 6,392,169 B1
(45) Date of Patent: May 21, 2002

(54) TWO HAND CONTROL OF WORKING APPARATUSES

(76) Inventors: Mats Linger, Karsegården, 439 00 Onsala; Torgny Olsson, Aprikosgatan 10, 233 00 Svedala; Gunnar Widell, Valhallagatan 17, 217 17 Malmö, all of (SE)

( * ) Notice: Subject to any disclaimer, the term of this patent is extended or adjusted under 35 U.S.C. 154(b) by 0 days.

(21) Appl. No.: 09/486,649
(22) PCT Filed: Aug. 21, 1998
(86) PCT No.: PCT/SE98/01506
 § 371 Date: Apr. 21, 2000
 § 102(e) Date: Apr. 21, 2000
(87) PCT Pub. No.: WO99/13262
 PCT Pub. Date: Mar. 18, 1999

(30) Foreign Application Priority Data

Aug. 21, 1997 (SE) .............................................. 9703023

(51) Int. Cl.⁷ .............................................. H01H 13/14
(52) U.S. Cl. .................................... 200/42.01; 200/334
(58) Field of Search .............................. 200/1 R, 17 R, 200/18, 42.01, 52 R, 51 LM, 330, 334; 307/113, 114; 361/189, 190

(56) References Cited

U.S. PATENT DOCUMENTS

| 4,918,560 A | * | 4/1990 | Storer .......................... 361/190 |
| 5,168,173 A | * | 12/1992 | Windsor ...................... 307/139 |
| 5,396,222 A | | 3/1995 | Markus et al. .............. 340/679 |
| 5,880,418 A | * | 3/1999 | Livesay ....................... 200/5 A |

FOREIGN PATENT DOCUMENTS

| DE | 2629720 | 1/1978 | ............. F16P/3/18 |
| WO | PCT/SE98/01506 | 8/1998 | ............. F16P/3/18 |

* cited by examiner

*Primary Examiner*—Michael Friedhofer

(57) ABSTRACT

A safety device for control of working apparatuses, e.g. presses, for which start and operation modes depend on essentially simultaneous activation of two separate operating devices, which are each controlled by the respective hands of the operator. Each operating device consists of two separate push buttons. The push buttons are arranged in a housing at a mutual distance from each other, which requires a two-hand operation, e.g. with at least two fingers. The push buttons are situated at a distance from each other.

7 Claims, 3 Drawing Sheets

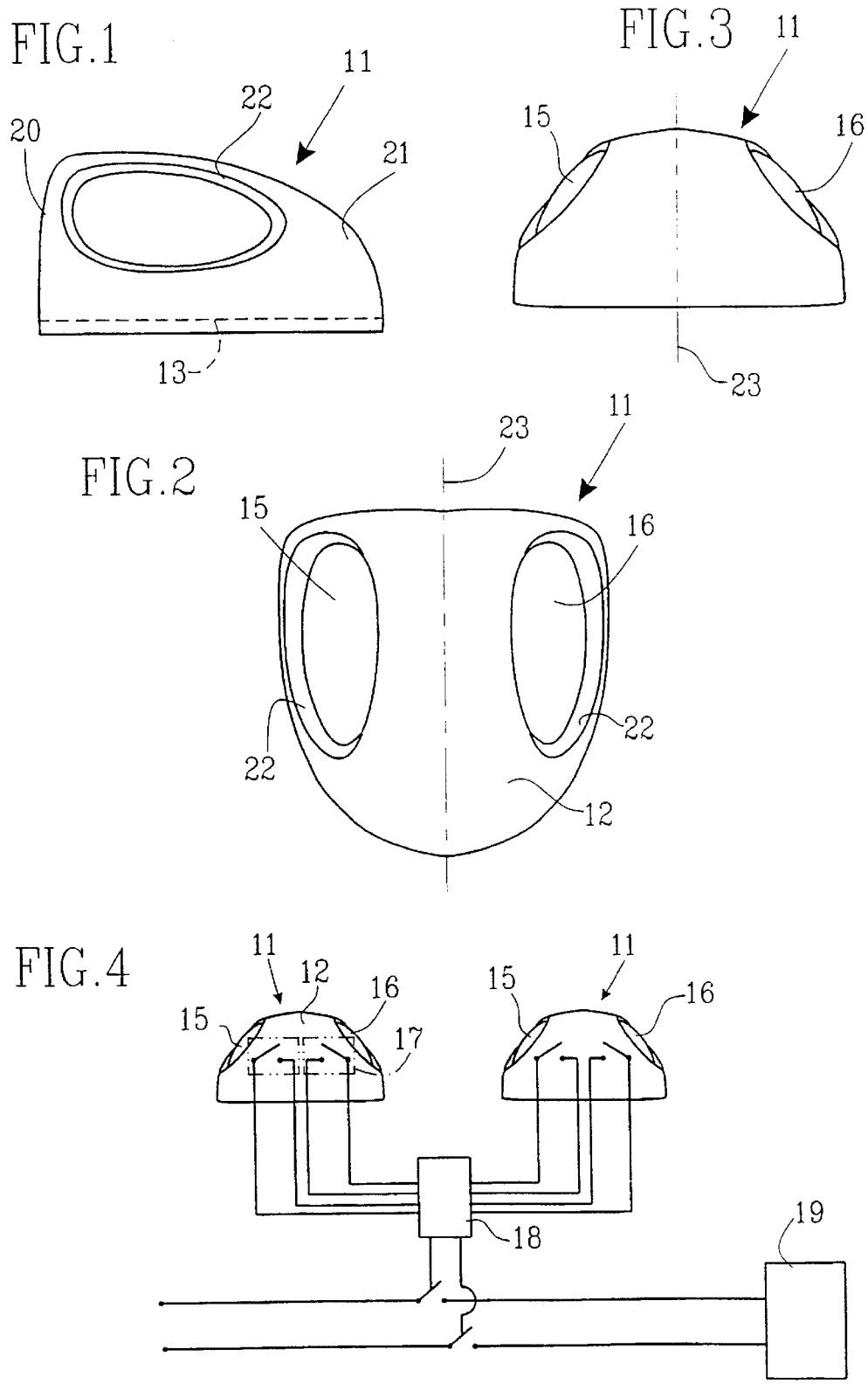

TWO HAND CONTROL OF WORKING APPARATUSES

The present invention relates to a safety device for control of working apparatuses (19), e.g., presses, which start and operation modes are dependant of essentially simultaneous activation of two separate operating devices (11), which each are being controlled by an operator by means of each hand.

THE BACKGROUND OF THE INVENTION AND THE PROBLEM

The two hand operating device is a safety device to protect the operator from reaching into areas, which can be dangerous to him, for instance starting a dangerous machine movement. According to present directions, the operating devices must be placed in specific given positions, where the shortest distance of protection can be calculated according to the formula s=v×t, where s is the distance of protection, v=the hand speed (normally 1.6 m/s when standing or slower work and 2.5 when seated and higher working tempo) and t=the total stopping time of the machine in ms. The control buttons can either be placed in a common housing or be totally separated.

The buttons of the operating devices are surrounded by protective housings to avoid the undeliberated release of the operating device by the operating person or even deliberately by e.g. usage of one of the fingers on one hand and the elbow and with the other hand feeding a work piece into the machine. The protective housings are arranged so that the push buttons are not affected from above, only by pressing from the side. This leads to ergonomically disadvantageous and tiring body posture, together with a decreased working tempo, since the operator has to look at the operating device in order to pass the protective housings.

THE OBJECT OF THE INVENTION

The object of the present invention is to provide a two hand device which:
- neither undeliberately or deliberately can be released by using just one hand, a hand and an arm/elbow, a hand and a foot or in another way, giving the operator a possibility to walk around the safety directions;
- will fulfill highly put ergonomical demands;
- lacks protective housings which makes the finding of the buttons more difficult;
- ensures a rapid and safe starting, and retaining the work operation without being tiring;
- characterized by a simple, reliable and cheap design.

The Solution of the Problem

The above mentioned objects have been solved by that the push buttons are situated in different relative to, preferably from each other faced planes, that the housing is designed as a rounded knob, e.g. elliptical or hemi-spherical, with a push button arranged on each side of the length axis of the body, and that the housing between the two push buttons is designed with an elevated part, e.g. designed as a ridge or the like, relatively the push buttons in order to separate the operating fingers.

DESCRIPTION OF THE DRAWINGS

The invention will below be closer described, in some embodiments with reference to the enclosed drawings.

FIGS. 1–3 shows a side view, a view from above and a front view of a first embodiment of an operating device of the invention.

FIG. 4 shows a circuit diagram for two operating devices included in a safety device, according to FIG. 3.

DESCRIPTION OF THE EMBODIMENTS

Figure 5:
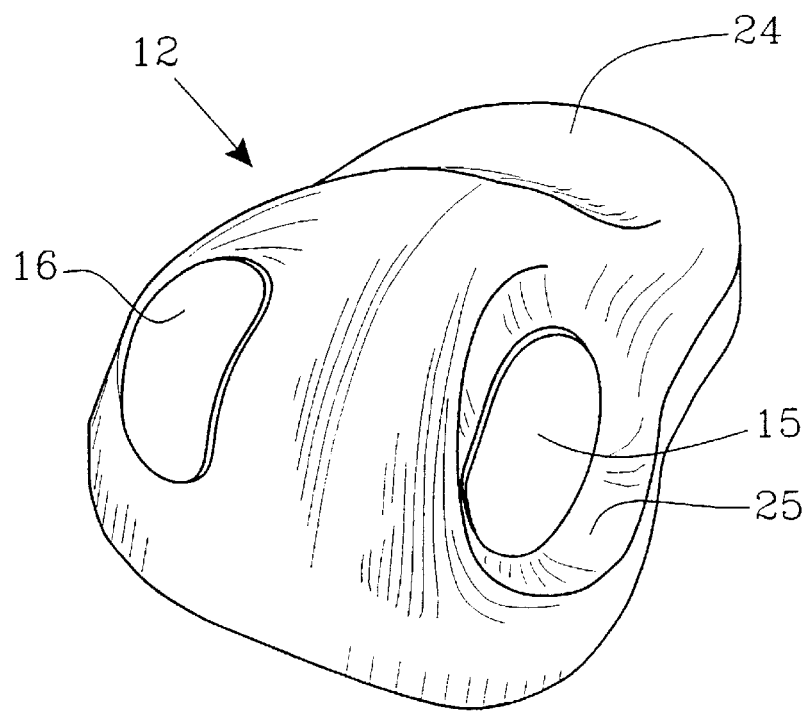
FIG. 5 shows in perspective a second embodiment of a operating device.

The safety device according to the invention comprises two separate operating devices 11, one for each hand, which devices are firmly arranged on a support, at a directed distance from each other. Each operating device consists of a housing 12 with a base plate 13 or a socket 14 (FIG. 8) intended to be attached to the support, which can be a desk (not shown) or the like. The operating devices 11 are each provided with two push buttons 15 and 16, which by pressing each affects one micro switch 17, arranged inside the housing 12. Both operating devices 11 are connected to a safety relay 18, which controls that all four push buttons 15, 16 is affected within a certain period of time, e.g. 0.5 s, which time period is controlled by a time relay (not shown) and must remain affected in order to activate the output of the relay and enable the starting of the machine 19 in question. If any of the push buttons is released the machine will be stopped. Restarting of the machine requires that all four push buttons have been released before a new start can be initiated. Short-circuiting or power failure will lead to a interruption of a begun machine movement. A restart can not be performed until the error has been corrected.

In the embodiment shown in FIGS. 1 to 3, the housing 12 has a globe-shape with an essentially planar end gable 20 in one end, whereas the other end has a soft rounding 21, in the shape of a curved hand and serves as a support for the hand. The push buttons 15 and 16 are partly recessed in oval cavities 22 and localised on each side of and essentially symmetrical relative to the length axis 23 of the globe. The housing 12 is arranged so that the thumb and the index and/or the middle finger comfortably can press down the push buttons, and the reset spring of the push buttons have a relatively low spring constant, which means that only a minor force is required to affect the buttons. Preferably, the housing is made of a firm polymeric material, whereas the touching surfaces of the buttons consist of a elastic polymeric material, which is liquid-proof connected, with the material in the housing, so that the electrical components inside the housing are totally encapsulated.

The embodiment according to FIG. 5 differs from the preceding ones in that the housing 12 has been given an extended support surface 24 for the palm. Additionally, the push buttons 15, 16 are not symmetrically arranged, but still more adapted to the shape of a "normal" hand, with the push button for the thumb recessed in a groove 25 in the housing 12 and the other push button located on the surface.

Figure 6:
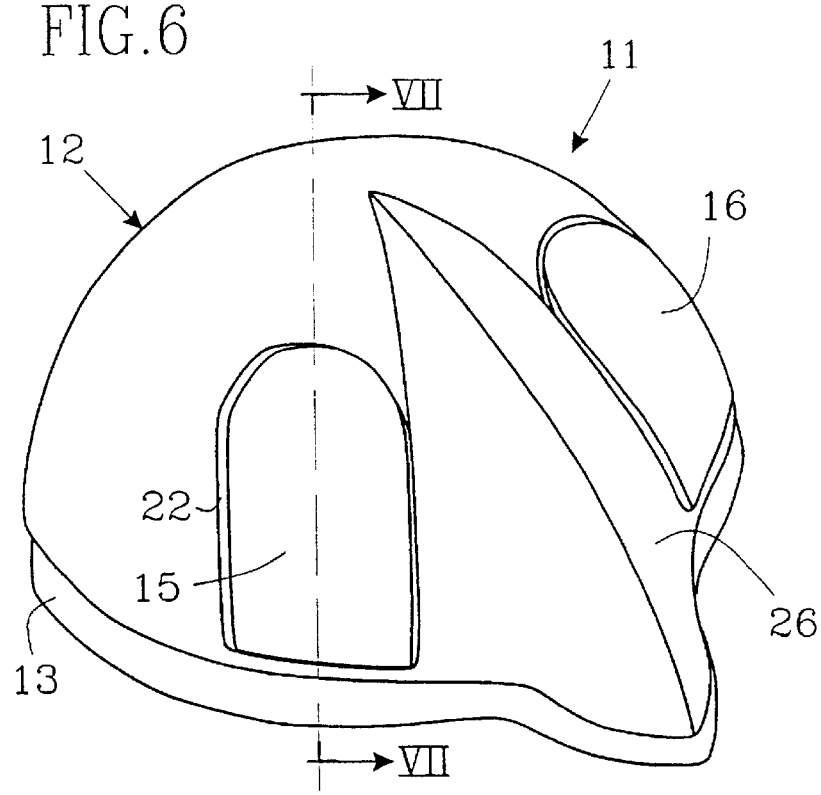
FIG. 6 shows in a view from above a third variant of an embodiment of an operating device.
Figure 7:
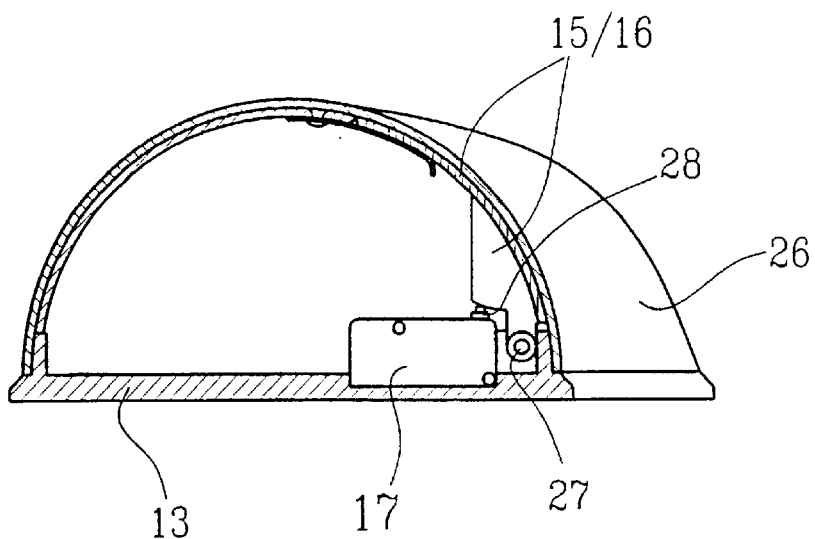
FIG. 7 shows a cut through VI—VII in FIG. 6.

The embodiment according to FIGS. 6 and 7 relates to a housing, which between the push buttons is provided with an elevated and/or a brought-forward part 26, which is intended to separate the operating fingers. The push buttons 15, 16, which are rotatable along a joint axle 27, is arranged with a step 28, which by pressing the push button affects the micro switch 17.

Figure 8:
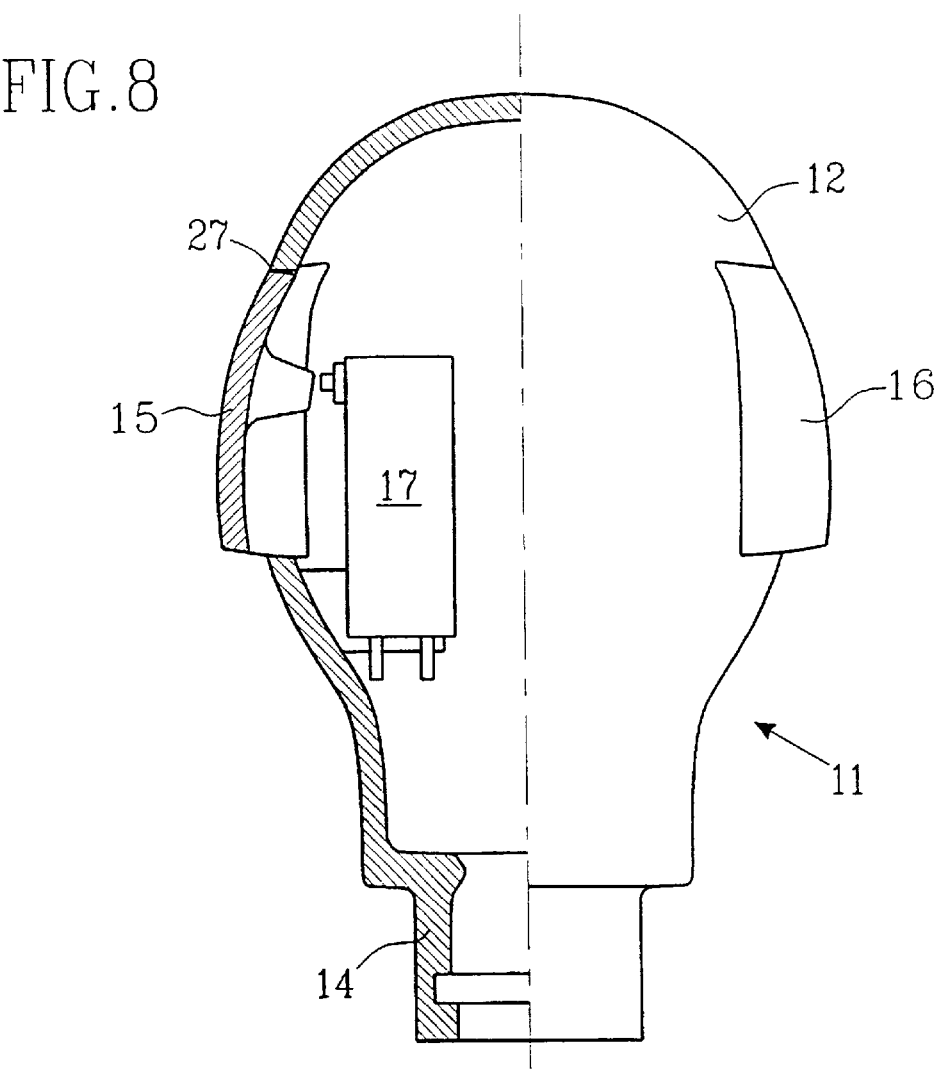
FIG. 8 shows a further modified operating device according to the invention, one left part in a cross-section and the other right part in a side view.

The embodiment according to FIG. 8 is the most preferred variant, which essentially has a pear shape, where the push buttons 15, 16 are located at its spherical part, either both buttons on the side or at the top and on the side.

The shape of the housing in all embodiments have been selected, so that the operator also in the darkness easily finds the operating devices and their push buttons and are ergonomically designed as to give the hands a good support.

What is claimed is:

1. A safety control of working apparatuses comprising first and second operating devices, each of said operating devices comprising two separate push buttons and a housing having both a bisecting length axis and a raised divider along its length, each of said push buttons having a contact surface for deployment and each of said push buttons being situated on opposing sides of said bisecting length axis of said housing, so as to separate the fingers of an operator depressing both of said push buttons.

2. The safety control of claim 1, characterized in that at least one of said housings has a shape selected from the group consisting of an elliptical shape, a substantially hemispherical shape, a pear shape, a teardrop shape and a rounded shape.

3. The safety control of claim 1, characterized in that said housings each define a pair of recesses, said push buttons being contained in said recesses.

4. The safety control of claim 1, characterized in that said housings are fabricated from a firm material, and said contact surfaces of said push buttons are fabricated from an elastic material.

5. The safety control of claim 1, characterized in that said housings are each provided with a support surface, said support surfaces being fashioned for conforming to the palm of a user's hand.

6. The safety control of claim 1, characterized in that said push buttons of said first and said second operating device are electrically connected to a time relay.

7. The safety control of claim 1, characterized in that said push buttons are spring-actuated with a relatively low spring constant.

* * * * *